United States Patent [19]

Uchiumi et al.

[11] 4,379,625
[45] Apr. 12, 1983

[54] OPERATION MICROSCOPE

[75] Inventors: Yoshihisa Uchiumi; Akira Tanabe, both of Tokyo, Japan

[73] Assignee: Tokyo Kogaku Kikai Kabushiki Kaisha, Tokyo, Japan

[21] Appl. No.: 248,032

[22] Filed: Mar. 27, 1981

[30] Foreign Application Priority Data

Apr. 3, 1980 [JP] Japan .................. 55-44012[U]
Oct. 31, 1980 [JP] Japan .................. 55-154786[U]

[51] Int. Cl.³ .................................................. G02B 21/06
[52] U.S. Cl. ................................................... 350/528
[58] Field of Search ............................ 350/19, 35, 91

[56] References Cited

U.S. PATENT DOCUMENTS

| 2,077,792 | 4/1937 | Heine | 350/19 |
| 2,691,918 | 10/1954 | Robins et al. | 350/19 |
| 2,947,216 | 8/1960 | Drews | 350/19 X |
| 4,148,552 | 4/1929 | Suzuki et al. | 350/91 X |

FOREIGN PATENT DOCUMENTS 1199018  8/1965  Fed. Rep. of Germany ........ 350/35

Primary Examiner—John K. Corbin
Assistant Examiner—Matthew W. Koren
Attorney, Agent, or Firm—Brumbaugh, Graves, Donohue & Raymond

[57] ABSTRACT

An operation microscope comprising an objective lens, a pair of magnification power changing lens systems, a pair of eye lenses, a camera body, a first illumination system for illuminating a part of a patient's body for observation, a second illumination system for illuminating the part of the body for photographing. Said second illumination system includes a light source for photographing which is positioned behind said objective lens and at a side of said pair of magnification power changing lens systems, so that an illuminating light bundle is directed for photographing through said objective lens.

4 Claims, 6 Drawing Figures

OPERATION MICROSCOPE

The present invention relates to an operation microscope, and more particularly to improvements in illumination means for photographing in the operation microscope.

Generally, an operation microscope includes a microscope body which is supported by a supporting arm mechanism swinging movements in lateral and vertical directions as well as a focusing movement along the optical axis thereof. Further, in order to provide a stereocopic observation, such an operation microscope generally includes an objective lens system which is asociated with eye lens systems usually including reflecting optical means for making it possible to observe a desired part of a patient's body in a desired direction. The objective lens system includes an objective lens and a pair of magnification power changing lens means. It is usual to provide beam splitting means in a microscope so that observation and photographing are carried out simultaneously. For this purpose, such conventional operation microscope comprises two illumination systems for observation and photographing. The illumination system for observation consists of a tungsten bulb positioned in the microscope body and an optical fiber for light guide, the one end of which is positioned against the tungsten bulb and the other end positioned against the objective lens. The illumination light bundle for observation that is emitted from the tungsten bulb is projected through the optical fiber and the objective lens to the patient's body. The illumination system for photographing is provided with a xenon lamp in a lamp house which is supported apart from the microscope body by a supporting arm for rotation in horizontal plane. However, according to this type of an operation microscope, the illuminating light is projected to the patient's body with a certain angle with respect to the photographing optical axis so that a portion of the illuminating light bundle is blocked by a peripheral portion of the patient's body where the operation is being made. This is particularly true in case of an internal ear and a hypophyseal duct tumor operation since the affected part is in a bottom of a deep recess. The illuminating light bundle for photographing may also be blocked by operating tools and operator's hands. The problem may be solved by locating the photographing illumination system in front of the objective lens. However, in this type of operation microscope, an operating space between the operation microscope and the affected part will be restricted. It should further be noted that, in an operation using an operation microscope, care must be made so that the patient's body is not tainted. For the purpose, the microscope body is usually covered with sterilized bag or cap. However, the illumination system supported by the supporting arm makes it inconvenient to cover the microscope body with such bag or cap.

In another type, the microscope comprises a xenon lamp which is positioned close to the end of the light guide optical fiber facing the tungsten lamp so that the both of the observation light bundle and the photographing light bundle pass through the optical fiber. However, such optical fiber causes a loss in the quantity of light passing therethroughout so that the illumination system for phtographing needs a light source of large intensity and an electric power source of a large power.

The present invention has therefore an object to provide an operation microscope in which illuminating light bundle for photographing is projected in almost the same direction as the phtographing optical axis through an objective lens so that it can illuminate even a part of the patient's body in a bottom of a recessed portion.

Another object of the present invention is to provide an operation microscope which has a wide operating space and can be covered easily with sterilized bag and cap.

Another object of the present invention is to provide an operation microscope which does not cause any loss of the illuminating light bundle for photographing and can replace a failed light source easily with a new one.

According to the present invention, the above and other objects can be accomplished by an operation microscope comprising an objective lens, a pair of magnification power changing lens systems, a pair of eye lenses, a camera body, a first illumination system for illuminating a part of a patient's body for observation, a second illumination system for illuminating the part of the body for photographing, characterized in that said second illumination system includes a light source for photographing which is positioned behind said objective lens and at a side of said pair of magnification power changing lens systems, so that an illuminating light bundle is directed for photographing through said objective lens. Preferably, said light source of said illumination system is positioned in a lamp house which is removably mounted a microscope body.

More preferably, said illumination system includes a mirror provided in a microscope body for reflecting an illumination light bundle from the photographing light source to said objective lens. More preferably, said lamp house is formed so as to fit to a vertical recess formed in said microscope body after removing the objective lens from the microscope body. More preferably, said lamp house is formed so as to fit to a lateral recess formed in said microscope body. More preferably, said lamp house has plugs which are inserted into a socket formed in said recess.

The above and other objects and features of the present invention will become apparent from the following descriptions of a preferred embodiment taking reference to the accompanying drawings, in which.

Figure 1:
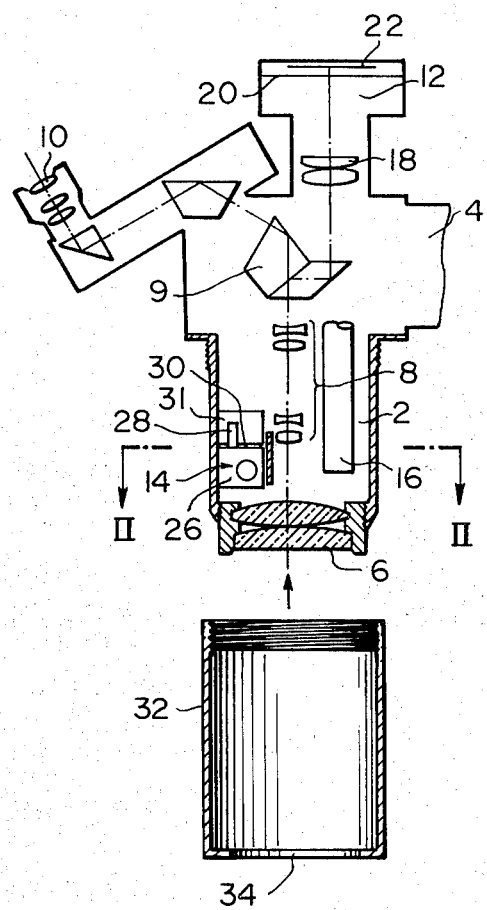
FIG. 1 is a schematical illustration of an optical arrangement of an operation microscope in accordance with the first embodiment of the present invention.
Figure 2:
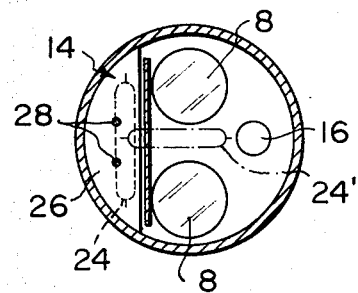
FIG. 2 is a sectional view taken substantially along the line II—II in FIG. 1.

In the drawings, same reference numerals have been used throughout to designate corresponding elements. Referring now to the drawings, particularly to FIG. 1, there is shown a microscope body 2 which is supported by a supporting arm mechanism 4. The microscope body 2 includes an objective lens 6, a pair of magnification power changing lens systems 8, an optical bundle splitting prism 9, a pair of eye lenses 10, a camera body 12, an illumination system for photographing 14 and an optical fiber of light guide 16 of illumination system for observation. The optical bundle splitting prism 9 splits an optical bundle which has passed through the objective lens 6 and the pair of the power changing lens systems 8 so that a pair of splitted optical bundles are passed to the pair of eye lenses 10 and to the camera body 12. The camera body 12 contains an imaging lens 18, a focal-plane shutter 20 and a film 22. The illumination system for observation consists of a tungsten bulb (not shown in FIG. 1) and the optical fiber for light guide 16. The exit end of the optical fiber is positioned behind the objective lens 6 so that the illumination light bundle from the optical fiber 16 is projected to a desired part of a patient's body through the objective lens 6. Referring now to FIG. 1 and 2, the photographing illumination system 14 consists of a xenon lamp 24 located in a lamp house 26 which has plugs 28 leading to the lamp 24. The lamp house 26 is positioned so that the xenon lamp 24 therein is positioned behind the objective lens 6 and at a side of the pair of magnification power changing lens systems 8. The xenon lamp 24 is of an elongated configuration and arranged with its longitudinal axis in parallel with a line passing through the optical axes of the pair of magnification power changing lens systems 8. Alternatively, it may be arranged with the longitudinal axis perpendicular to the aforementioned line as shown phantom lines 24′ in FIG. 2. The lamp house 26 is upwardly fitted to a recess 30 formed in the microscope body 2 at a bottom portion thereof after removing the objective lens 6 from the microscope body 2. In the recess 30, there is provided a socket 31 which is adapted to receive the plugs 28 so that an electric power source for the lamp is fed through a circuit in the microscope body 2. The microscope body 2 may be covered by a sterilized cap 32 which is provided with an aperture 34 so that the objective lens 6 is exposed through the aperture 34.

Figure 3:
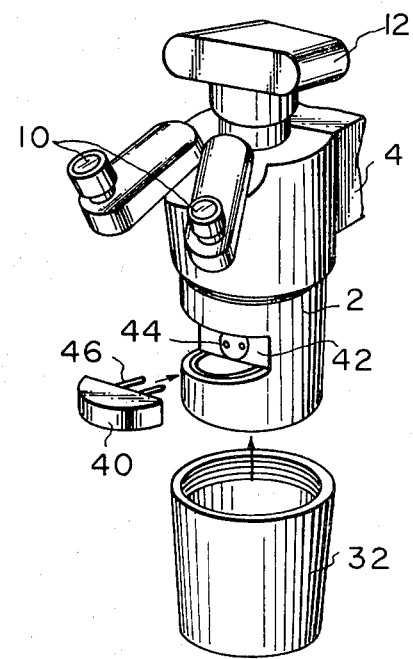
FIG. 3 is a perspective illustration of the operation microscope in accordance with the second embodiment of the present invention.

Referring now to FIG. 3, there is shown an operation microscope in accordance with the second embodiment of the present invention. In this embodiment, a lamp house 40 is sidewardly fitted to a lateral recess 42 formed in the microscope body 2 at a side portion thereof. In the recess 42, there is provided a socket 44 which is adapted to receive the plugs 46.

Figure 4:
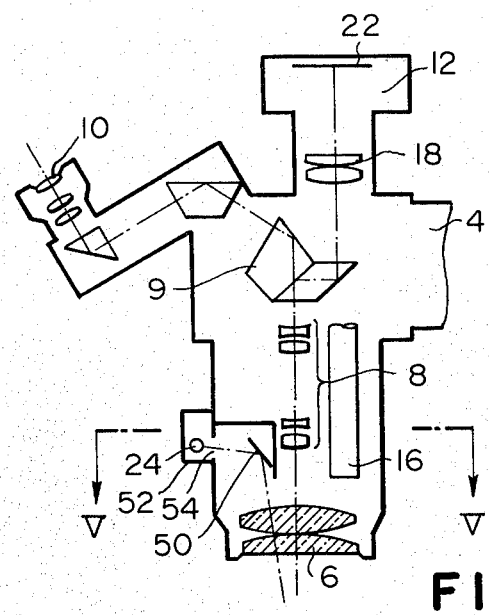
FIG. 4 is a schematical illustration of an optical arrangement of an operation microscope in accordance with the third embodiment of the present invention.
Figure 5:
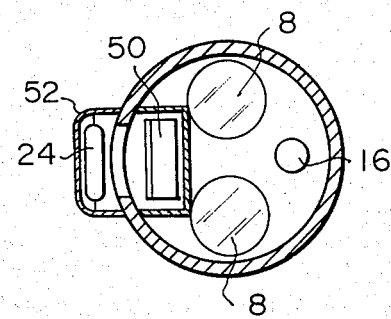
FIG. 5 is a sectional view taken substantially along the line V—V in FIG. 4.
Figure 6:
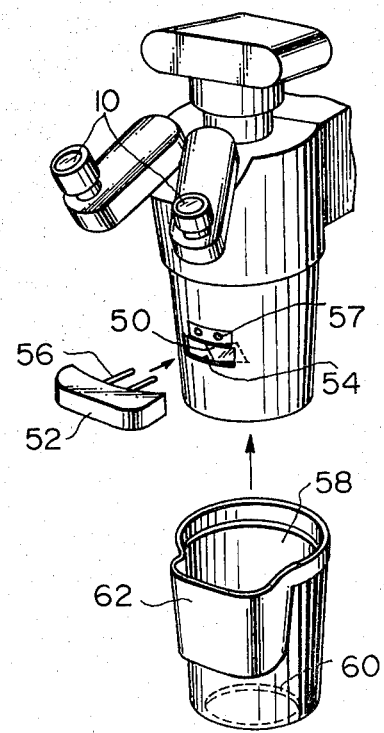
FIG. 6 is a perspective illustration of the operation microscope shown in FIG. 4.

Referring now to FIGS. 4 through 6, there is shown an operation microscope in accordance with the third embodiment of the present invention. In this embodiment, the light from the xenon lamp 24 which is adapted for illuminating the patient's body for photographing is directed toward the objective lens 6 by means of a mirror 50 which is provided behind the objective lens 6 and at a side of the pair of magnification power changing lens systems 8. The lamp 24 is located in a lamp house 52 which is sidewardly fitted to a lateral recess 54 formed in the microscope body 2 at a side of the mirror 50. The lamp house 52 has plugs 56 which are inserted into a socket 57 formed a side of the recess 54 for the purpose. An illuminating light bundle from the xenon lamp 24 is at first directed substantially laterally and reflected at the mirror 50 downwardly through the objective lens 6 to be projected to the patient's body. The microscope body 2 may be covered by a sterilized cap 58 which is provided with an aperture 60 and a projection 62 for accommodating the lamp house 52.

The invention has thus been shown and described with reference to specific arrangement, however, it should be noted that the invention is in no way limited to the details of the illustrated structures but changes and modifications may be made without departing from the scope of the appended claims.

We claim:

1. An operation microscope comprising a body, an objective lens, a pair of magnification power changing lens systems located behind said objective lens and in parallel with an optical axis of said objective lens, a light dividing means for dividing light passed through at least one of the pair of magnification power changing lens systems and for introducing said light into a pair of eye lenses and a camera, a first illumination system for illuminating operated parts of a patient's body for observation, and a second illumination system for illuminating operated parts of the patient's body for photographing, said second illumination system including a lamp house and a socket, said socket being positioned in a recess formed in said microscope body at a side of said pair of magnification power changing lens systems, said lamp house having a plug and being adapted to be fitted to said recess after removing said objective lens from said microscope body so as to insert said plug into said socket, and said lamp house including a light source.

2. A microscope according to claim 1 wherein the light source of the second illumination system is an elongated light source and is positioned with its longitudinal axis substantially perpendicular to a line perpendicularly passing through both optical axes of the pair of magnification power changing lens systems.

3. An operation microscope comprising a body, an objective lens, a pair of magnification power changing lens systems located behind said objective lens and in parallel with an optical axis of said objective lens, a light dividing means for dividing light passed through at least one of the pair of magnification power changing lens systems and for introducing said light into a pair of eye lenses and a camera, a first illumination system for illuminating operated parts of a patient's body for observation, and a second illumination system for illuminating operated parts of the patient's body for photographing, said second illumination system including a lamp house and a socket, said socket being located in a lateral recess formed in said microscope body at a side portion thereof, said lamp house having a plug and being fitted to said lateral recess so as to insert said plug into said socket, said lamp house having an outer wall that forms part of the microscope body after said lamp house is inserted in said recess, and said lamp house including a light source.

4. A microscope according to claims 1 or 3 wherein the light source of the second illumination system is an elongated light source and is positioned with its longitudinal axis substantially parallel with a line perpendicularly passing through both optical axes of the pair of magnification power changing lens systems.

* * * * *